United States Patent [19]

Hyppanen

[11] Patent Number: 5,406,914
[45] Date of Patent: Apr. 18, 1995

[54] METHOD AND APPARATUS FOR OPERATING A CIRCULATING FLUIDIZED BED REACTOR SYSTEM

[75] Inventor: Timo Hyppanen, Karhula, Finland

[73] Assignee: A. Ahlstrom Corporation, Noormarkku, Finland

[21] Appl. No.: 131,852

[22] Filed: Oct. 5, 1993

Related U.S. Application Data

[63] Continuation-in-part of Ser. No. 973,396, Nov. 10, 1992, Pat. No. 5,341,766, and a continuation-in-part of Ser. No. 41,571, Apr. 5, 1993, Pat. No. 5,332,553, and a continuation-in-part of Ser. No. 41,580, Apr. 5, 1993, Pat. No. 5,345,896, and a continuation-in-part of Ser. No. 66,277, May 26, 1993, and a continuation-in-part of Ser. No. 89,810, Jul. 12, 1993, and a continuation-in-part of Ser. No. 124,767, Sep. 22, 1993.

[51] Int. Cl.$^6$ .............................................. B09B 3/00
[52] U.S. Cl. ................... 122/4 D; 110/245; 165/104.16
[58] Field of Search ............. 122/4 D; 165/104.16; 422/145, 146; 110/245

[56] References Cited

U.S. PATENT DOCUMENTS

| | | |
|---|---|---|
| 4,457,289 | 7/1984 | Korenberg . |
| 4,594,967 | 6/1986 | Wolowodiuk ................ 122/4 D |
| 4,813,479 | 3/1989 | Wahlgren . |
| 5,014,652 | 5/1991 | Hyldgaard . |
| 5,054,436 | 10/1991 | Dietz ................ 122/4 D |
| 5,060,599 | 10/1991 | Chambert . |

FOREIGN PATENT DOCUMENTS 2057028 10/1991 Canada .
WO90/05020 5/1990 WIPO .

*Primary Examiner*—Denise L. Gromada
*Attorney, Agent, or Firm*—Nixon & Vanderhye

[57] ABSTRACT

A circulating fluidized bed (CFB) system, and a method of operation thereof, provide a heat transfer zone containing primarily clean fluidizing gas providing advantageous conditions for superheating, while providing a large enough flow of solid material in the heat exchange chamber during both high and low load conditions to achieve the desired heat transfer capacity. The heat exchange chamber is provided near the bottom of a return duct connected between the particle separator and combustion chamber of the CFB, with a common wall separating the combustion and heat exchange chambers. Particles are reintroduced into the combustion chamber through a solid particle inlet (plurality of narrow, substantially horizontal, elongated, vertically stacked slots) in the common wall, and particles may pass directly from the combustion chamber into the heat exchange chamber through a passage in the common wall above the solid particle inlet. A gas inlet may also be provided in the common wall, above the passage, to allow fluidizing gas from the heat exchange chamber to flow into the combustion chamber.

29 Claims, 2 Drawing Sheets

METHOD AND APPARATUS FOR OPERATING A CIRCULATING FLUIDIZED BED REACTOR SYSTEM

CROSS REFERENCE TO RELATED APPLICATIONS

This application is a continuation-in-part of each of the following applications: Ser. No. 07/973,396 filed Nov. 10, 1992 (Att. Dkt. 30-213) now U.S. Pat. No. 5,341,766; Ser. No. 08/041,571 filed Apr. 5, 1993 (Att. Dkt. 1497-4) now U.S. Pat. No. 5,332,55; Ser. No. 08/041,580 filed Apr. 5, 1993 (Att. Dkt. 1497-5) now U.S. Pat. No. 5,345,896; Ser. No. 08/066,277 filed May 26, 1993 (Att. Dkt. 1497-8); and Ser. No. 08/124,767 filed Sep. 22, 1993 (Att. Dkt. 1497-9).

BACKGROUND AND SUMMARY OF THE INVENTION

This invention relates to a novel method and an apparatus for operating a circulating fluidized bed (CFB) system.

CFB systems, such as circulating fluidized boilers, include a combustion chamber, having a fast (e.g. gas velocities greater than 2 m/s) fluidized bed of solid particles established therein. A particle separator is connected to a discharge opening in the upper part of the combustion chamber and a return duct is connected thereto, for recycling particles separated in the separator through a solid particle inlet into the lower part of the combustion chamber. A heat exchanger may be connected to the recycling system for recovering heat from the system.

Typically, heat is recovered from fluidized bed boilers by heat transfer surfaces in the combustion chamber and in a convection section disposed in the pat of the hot flue gas. The peripheral walls of the combustion chambers are made as membrane walls in which vertical tubes are combined by fins to form evaporating surfaces. Additional heat transfer surfaces such as superheaters may be disposed within the upper part of the combustion chamber for superheating the steam.

Corrosion and erosion constitute problems in the high temperature and high flow velocity surroundings within the combustion chamber and convection section, and the heat transfer surfaces have to be made of expensive heat resistant material.

In conventional CFB systems, it also can be difficult to achieve desired superheating of steam at low load conditions. The combustion chamber exit gas temperature tends to decrease with decreasing load and special arrangements have to be made in order to achieve desired results with superheaters in the convection section. Additional superheaters disposed within the combustion chamber are not an acceptable solution since they increase cost and control problems in the boiler. Thus there is a need, especially for pressurized applications, to find new ways of adding heat transfer surfaces into the system without having to increase the size of the combustion chamber, which would increase the size of the pressure vessel.

It has been suggested to use external separate heat exchangers (EHE) for increasing superheating capacity. The external heat exchangers usually consume too much space, making it difficult to control heat transfer at different (e.g. fluctuating) load conditions.

It has been suggested in U.S. Pat. No. 4,716,856 to include heat transfer surfaces in the recycling system of a circulating fluidized bed reactor. The heat transfer surfaces are then disposed in a fluidized bed of solid circulating material collected in a heat exchanger chamber formed in the bottom part of the return duct. Thus the circulating solid material provides the additional heat needed for superheating, etc., without a need to utilize separate external heat exchangers. This system is, however, dependent on hot solid particles being entrained with the flue gases and recycled into the heat exchanger chamber. At low load conditions, and hence low fluidizing gas flow velocities, the volume of hot particles present in the gas flow may be too small to maintain the heat transfer capacity needed for superheating.

The present invention provides a method and an apparatus for operating circulating fluidized bed systems in which the above mentioned drawbacks are minimized. The present invention also provides an improved method and apparatus for heat recovery at different loads in circulating fluidized bed systems.

According to the present invention an improved method of operating a CFB system is provided including a heat exchanger chamber formed in the lower part of the return duct, the heat exchanger chamber having one wall section in common with the combustion chamber. The method comprises the following steps: (a) Establishing a fast fluidized bed of solid particles in the combustion chamber so that a particle suspension comprising flue gases and solid particles entrained therein is caused to flow upwardly in the combustion chamber and to be discharged through the discharge opening. (b) Separating solid particles from the particle suspension in a particle separator. (c) Directing separated solid particles into a return duct having a heat exchanger chamber in a lower portion thereof. (d) Establishing a bed of solid particles in the heat exchanger chamber. (e) Reintroducing solid particles from the heat exchanger chamber into the combustion chamber through a solid particle inlet disposed in the common wall section; and (f) introducing additional solid particles directly from the combustion chamber into the lower portion of the return duct.

During high load conditions a large solid particle flow is entrained with the flue gases and recycled through the separator, return duct and heat exchanger chamber into the combustion chamber, providing the desired heat transfer capacity. During low load conditions solid particles are caused to flow directly from the combustion chamber into the heat exchanger chamber through a passage in the common wall therebetween, the direct solid flow enhancing the heat transfer capacity so that it achieves the desired level.

Solid particles may be reintroduced from the heat exchanger chamber into the combustion chamber through a solid particle inlet or inlets disposed in the common wall between the chambers. The solid particle inlet or inlets may be disposed in the lower part of the heat exchanger chamber below the surface of the particle bed therein or the solid particle inlet(s) may constitute overflow openings higher up in the heat exchanger chamber, allowing gas also to flow from the return duct into the combustion chamber. In many applications both types of solid particle inlets are utilized. The inlets disposed below the surface of the particle bed comprise—according to a preferred embodiment of the invention—a solid flow seal formed by two or more narrow (small vertical dimension) substantially horizontal slots disposed on top of each other in the common wall preventing uncontrolled flow of particles through the inlets. The slots may be prefabricated in a frame like construction which is built into the wall.

In order to prevent a direct and an uncontrolled flow of particles through the slots, the slots should have a height (h) to length (l) ratio $h/l < 0.5$. Slots having a length of about 200 mm to 300 ram, e.g. the length of the cross section of the common wall in which the slots are formed, should have a height $<100$ mm to 150 mm to be able to prevent an uncontrolled flow of particles therethrough. In such slots solid particles tend to build up and form a sealing plug preventing flow by gravity. A desired flow of solid particles through the slots is achieved by transporting gas being introduced into the bed in the vicinity of the slots. Thus it is possible to control the solid particle flow through the inlets and the flow of particles passing the heat transfer surfaces in the heat exchanger bed.

The substantially horizontal slots in the inlets need not be completely horizontal, but rather can be inclined, having outlet ends in the combustion chamber at a higher level than the inlet ends in the return duct, so that the length (l) of the slots can be further decreased compared to horizontal slots having the same cross section. The inclined slots also prevent coarse material from accumulating at the inlet end of the slots.

The total vertical extension $h_{tot}$ needed for an imaginary single large opening can—according to one important aspect of the invention—be divided into several vertical extensions $h_1$, $h_2$, $h_3$, ..., each divided vertical extension being just a fraction of the total $h_{tot}$ needed. The length (l) of each slot can then be decreased in the same proportion as the vertical extension is decreased, without the sealing effect of the solid flow being decreased.

According to a preferred embodiment of the invention short slots, only long enough to extend through a common (usually refractory) lined membrane wall, between the heat exchanger chamber and the combustion chamber, can be used for transporting particles, while still providing an adequate solid flow seal. These slots have an approximate length (l)=the total width (w) of the common wall between the two chambers, the width of the wall including tubes and refractory lining. This is a considerable improvement over prior art L-valve seals which reach far out from the combustion chamber and consume a large amount of space. The present invention provides a very compact structure in which the solid flow seal can be integrated into the wall construction.

The solid flow seal passages may easily be formed in the fins which connect the tubes in a conventional membrane tube wall. In many cases the passages may be formed in a wall section where tubes have been bent apart from each other to provide the space needed for the passages. The passages may be disposed on top of each other, forming e.g. a Ahlstrom "gill seal" type of solid flow seal connection, and combined in prefabricated frames.

The solid particles may—especially at high load conditions—be reintroduced into the combustion chamber by overflow through one or more overflow openings formed in the common wall at a higher level than the solid particle inlets described above. Especially at high load conditions, both types of solid particle inlets may be used.

By using small overflow openings for reintroducing solid particles from the heat exchanger chamber into the combustion chamber, large particles are prevented from flowing in the other direction, i.e. from the combustion chamber into the heat exchanger chamber. During high load conditions rather large particles may be fluidized in the lower part of the combustion chamber. It is not desirable to move large particles into the heat exchanger chamber.

At low load conditions there may be no need to reintroduce solid particles through an overflow opening into the combustion chamber. The bed surface level in the heat exchanger chamber may be maintained below the overflow opening and the overflow opening may instead be utilized as a passage introducing solid particles from the combustion chamber into the heat exchanger chamber. At low load conditions the reintroduction of solid particles may also take place solely through an overflow opening or through both types of solid particle inlets.

The overflow opening reintroducing solid particles into the combustion chamber may be constructed so that it can simultaneously or alternatively introduce solid material from the combustion chamber into the return duct as well as from the return duct into the combustion chamber. On the other hand different types of openings for introducing solid particles into the return duct and for reintroducing solid particles into the combustion chamber may be used. The various particle-introducing openings may be disposed horizontally side by side, or stacked vertically one on top of the other. Gas nozzles, injecting gas flows into or in the vicinity of the overflow openings, may be used to control the solid flow through the openings, e.g. to prevent solid particles from flowing from the combustion chamber into the return duct. Gas flowing through the openings may be used as secondary or similar air in the combustion chamber. Additional openings may also be formed higher up in the common wall between the return duct and the combustion chamber primarily for introducing gas from the return duct into the combustion chamber.

The bed of particles in the heat exchanger is fluidized in order to enable heat transfer between the particles and heat transfer surfaces disposed in the bed. Fluidizing gas is preferably discharged from the return duct through gas flow openings above the fluidized bed. In order to prevent fluidizing gas from flowing into the particle separator a gas seal may be disposed between the return duct and the separator. The gas seal may constitute a bed of particles disposed in a bottom duct of the separator. The bottom duct is preferably connected by a solid flow seal with the return duct. The solid flow seal preferably comprises two or more vertically narrow horizontal slot like openings stacked one on top of the other in a common wall between the bottom duct and the return duct preventing uncontrolled flow of particles from the bottom duct into the return duct.

The heat transfer from particles to heat transfer surfaces, such as superheater surfaces, may—according to a preferred embodiment of the invention—be controlled by fluidizing gas. An increased fluidizing gas flow and increased movement of particles around the heat transfer surfaces provides increased heat transfer. Gas, such as air or inert gas, for heat transfer control may be introduced through several separate nozzles.

According to another preferred embodiment of the invention, heat transfer may be controlled by controlling the flow of hot solid particles flowing through the bed, i.e. from the bed surface down to the solid particle inlets in the bottom of the bed. This is achieved by controlling the flow of transporting gas controlling the reintroduction of particles through the solid particle inlets. A surplus portion of solid particles being introduced into the return duct and not needed for heat transfer are reintroduced into the combustion chamber by overflow.

By decreasing the amount of solid material being transported through the solid particle inlet(s) below the bed surface and correspondingly increasing the overflow of particles into the combustion chamber, an increased volume of particles reaches only as high as the surface of the bed of solid particles before being reintroduced into the combustion chamber. A decreased volume of solid particles thus flows through the bed in contact with heat transfer surfaces. Thus the temperature in the bed decreases, and heat transfer also decreases due to the lower temperature difference between particles and heat transfer surfaces.

By increasing the volume of solid material being transported through the solid particle inlet(s) an increased amount of fresh hot solid material may continuously be transported through the bed, increasing the temperature and thus increasing heat transfer in the bed.

In the bottom of the return duct the bed moves slowly downwardly as solid material is reintroduced into the combustion chamber and new material is continuously added on top of the bed. The height of the bed may thus—according to a third preferred embodiment of the invention—be controlled, in a heat exchanger chamber not having an overflow opening, by controlling the transporting gas reintroducing solid material into the combustion chamber. The height of the bed may then—in some cases—be used to control the heat transfer.

A barrier bed portion of solid particles may be maintained between transporting gas inlets in the vicinity of the solid particle inlets below the bed surface and the fluidizing gas inlets in the heat transfer section of the heat exchanger chamber. A barrier bed close to the transporting gas inlets prevents transporting gas from interfering with the desired heat transfer, while a barrier bed portion of solid particles maintained in the heat transfer section prevents fluidizing gas from interfering with the transport of solid particles through the bed. In most cases both these goals can be achieved using a single barrier bed portion.

The heat exchanger chamber may have an inclined or staged bottom in order to more easily provide for a suitable barrier bed between the transporting gas inlets and fluidizing gas inlets. A partition wall may be disposed on the inclined bottom between the heat transfer and particle transporting sections. Fluidizing gas is introduced through the upper inclined bottom portion into the heat transfer section. Transporting gas is introduced through the lower portion of the inclined bottom. A barrier bed of, for example, only slightly fluidized particles is maintained preferably on the lower portion of the inclined bottom.

The present invention may be applied in reactor systems having return ducts with horizontal bottoms also, as long as care is taken that a barrier bed is allowed to be formed on a portion of the bottom, for preventing transporting gas or fluidizing gas from interfering with each other.

The heat exchanger chamber may—according to another aspect of the present invention—have a staged bottom, in which a heat transfer section and solid particle inlets are disposed at different levels. The heat transfer section is disposed at a higher level than the discharge of solid particles. The solid particle inlets may open into a downwardly directed duct or channel portion of the heat exchanger chamber, the channel portion being connected to the combustion chamber.

The particles are preferably reintroduced directly from the heat exchanger chamber into the combustion chamber, but can—if necessary—be reintroduced through an intermediate chamber, which then is connected with the combustion chamber.

The present invention provides an important improvement in the control of heat transfer at both high and low loads. A large enough flow of solid material is maintained in the heat exchanger chamber both during high and low load conditions to achieve the desired heat transfer capacity.

The gas space in the heat transfer zone contains primarily clean fluidizing gas without alkaline, chlorine, or other corrosive gaseous components, and thus provides very advantageous conditions for superheating. Superheaters in this zone may thus be heated to much higher temperatures than possible in corrosive conditions prevailing in the combustion chamber itself. Steam of $>500°$ C., even $>550°$ C., may also be produced when burning corrosive gaseous component-containing fuels.

It has especially been a problem in waste/RDF burning boilers to utilize the heat for superheating, due to the unclean gases, containing different kinds of corrosion causing components. The present invention overcomes this problem by providing a system in which superheater surfaces contact hot circulating material in a safe gas atmosphere. Also erosion is minimized by using a slowly bubbling bed (having gas velocities of $<1$ m/s) in the heat exchanger chamber. Particles colliding with the heat transfer surfaces have a very low impact velocity. Additionally, erosion in the return duct bed is relatively low due to the small particle size of bed material.

According to the invention when the bed in the solid bed chamber is divided into a heat transfer section and a solid particle discharge section close to the solid particle inlets by an inclined bottom (or a separate lower outlet channel portion in the return duct) a significant advantage is achieved; namely, large particles (e.g. ash particles, agglomerates formed in the bed, or refractory material broken loose from the return duct walls) fall by gravity downwardly in the return duct below the level of the fluidizing gas inlet, and away from the heat transfer zone, where they could cause mechanical damage and other problems (such as a decrease in heat transfer).

The present invention provides a very simple and compact CFB boiler construction. The whole recycling system, including separator and return duct, may be primarily constructed of two at least partly parallel vertical water tube wall panels forming a substantially vertical channel therebetween. The channel preferably has one wall in common with the combustion chamber. The channel typically has a separator in its upper part, a return duct in its middle part, and a solid bed chamber in its lowermost part. The solid inlets, overflow openings, and other gas and solid material passages connecting the return duct with the combustion chamber may be prefabricated in the common wall, e.g. as a frame like construction. Such a frame structure may also be easily connected to the membrane wall on site.

The present invention is particularly advantageous in pressurized fluidized bed systems (i.e. operated at significantly above atmospheric pressure, e.g. at least twice atmospheric pressure), as additional heat transfer surfaces can be located in the return duct in a usually empty space in the pressure vessel and as the additional heat transfer can be controlled by relatively small gas flows and hence small equipment. The present invention provides a compact combustor system, which is easy to build into a pressure vessel.

BRIEF DESCRIPTION OF THE DRAWINGS

The invention will be described further, by way of example, with reference to the accompanying drawings in which.

DETAILED DESCRIPTION OF THE DRAWINGS

Figure 1:
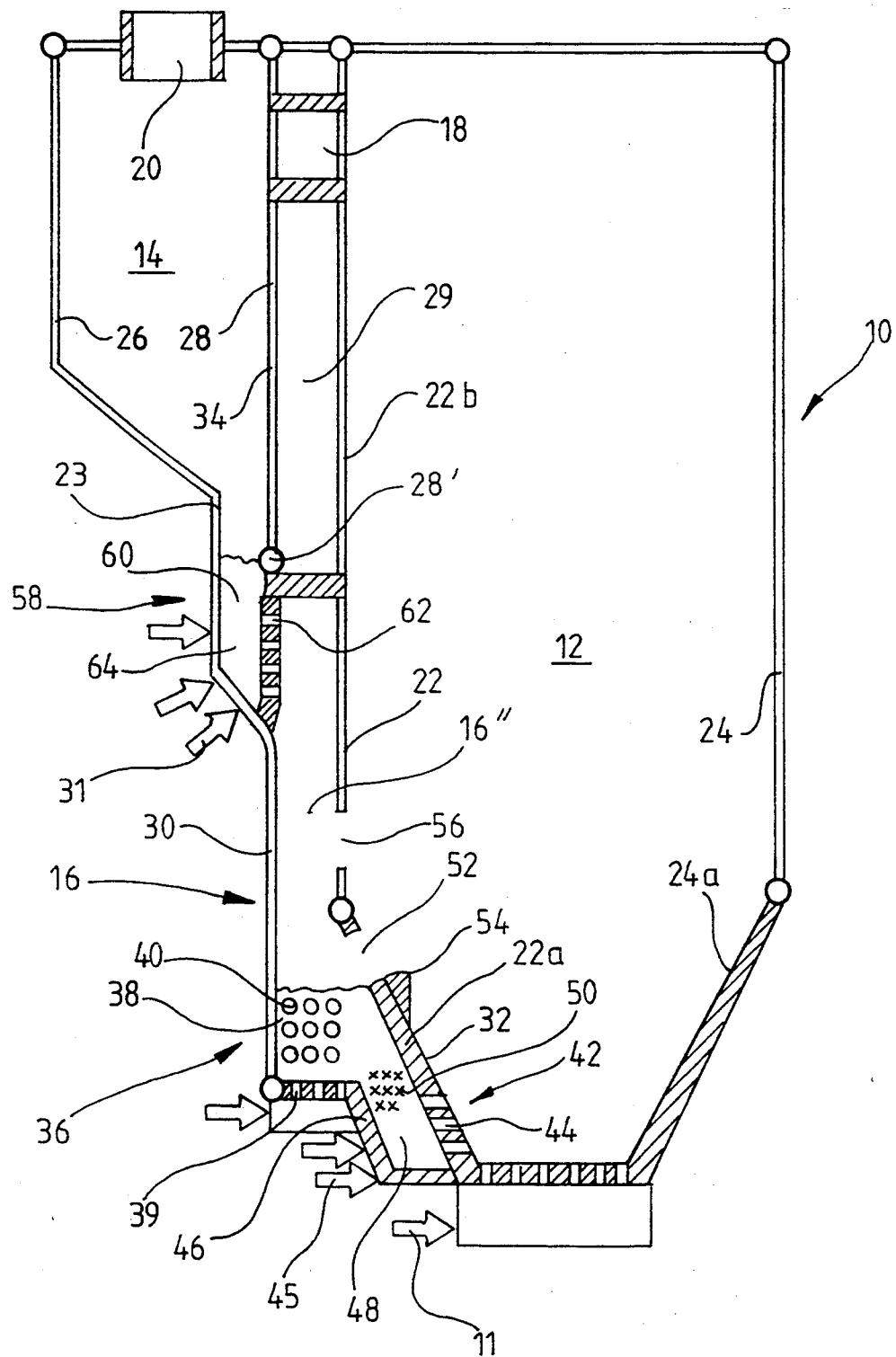
FIG. 1 shows a schematic vertical section through a circulating fluidized bed apparatus according to one exemplary embodiment of the invention.

FIG. 1 shows a circulating fluidized bed combustor 10 having a combustion chamber 12 with a fast fluidized bed of particles therein, fluidizing and/or combustion gases (e.g. air) being introduced at 11. A particle separator 14 is connected to the upper part of the combustion chamber 12, for separating particles entrained with the mixture of flue gases and solid material being discharged from the combustion chamber 12. A return duct 16 is provided for recirculating separated solid material from the separator 14 into the lower part of the combustion chamber 12. A discharge opening 18 connects the particle separator 14 to the combustion chamber 12. A gas outlet 20 is disposed in the top of the particle separator 14.

The walls 22, 24 of the combustion chamber 12, the walls 22, 26, 28 of the separator 14, and the walls 30, 22 of the return duct 16 are preferably made of water tube or membrane panels. The lower portions (e.g. 22a, 24a) of the walls 22, 24, 30 in the combustion chamber 12 and the return duct 16 may be protected by a refractory lining 32.

The separator 14 and return duct 16 are connected to one side wall 22 of the combustion chamber 12, thereby forming an integral construction. The separator 14 and the return duct 16 are formed in a space between the side wall 22 and a vertical tube panel 23 disposed parallel to the side wall 22. The side wall 22 thus forms one wall of the separator 14, and one wall of the return duct 16. The lower downwardly inclined portion of the side wall 22 forms a common wall 22a between the return duct 16 and the combustion chamber 12, and the upper part of the side wall 22 forms one part of a double wall construction 22b between the separator 14 and the combustion chamber 12. The vertical tube panel 23 forms the opposite (from wall 22) walls of the separator 14 and the return duct 16. The upper part of the vertical tube panel 23 forms the outer wall 26 of the separator 14, and the lower part of tube panel 23 forms the outer wall 30 in the return duct 16. The vertical tube panel 23 is disposed at a desired distance from the side wall 22 to provide a cyclone effect to separate introduced gases and solids in a gas/solid suspension. At a middle portion thereof, the vertical tube panel 23 is bent towards the side wall 22 to provide a return duct channel 60 with a smaller cross section (desired for solids flow).

An inner wall 28, formed of a second tube panel 34, is preferably disposed in the separator 14 between the side wall 22 and the outer wall 26 to provide a double wall construction between the separator 14 and the combustion chamber 12. A lower header 28' is provided for tube panel 34, connecting it to a fluid recirculation system. The gas space 29 between the inner wall 28 and the upper part 22b of side wall 22 is a gas tight space isolated from the gas spaces of the combustion chamber 12, the particle separator 14, and the return duct 16. In some applications no double wall construction, and hence no inner wall 28, is needed, in which case the upper part of side wall 22 may form a common wall between the separator 14 and the combustion chamber 12.

Figure 2:
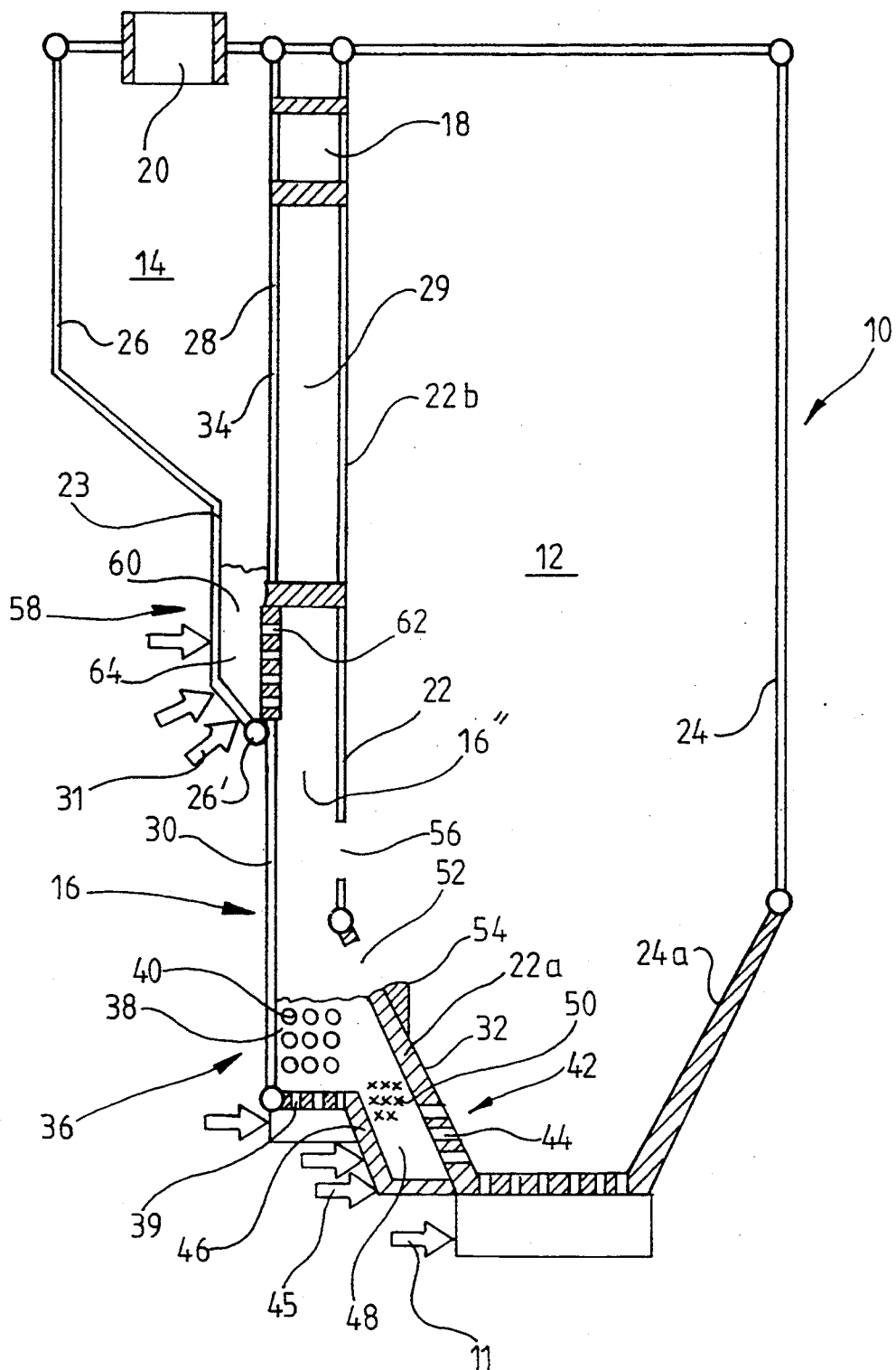
FIG. 2 is a detailed view like that of FIG. 1 of a second exemplary CFB apparatus according to the invention.

In another alternative embodiment (see FIG. 2—in FIG. 2 components comparable to those in the FIG. 1 embodiment are shown by the same reference numerals) the double wall construction of the separator 14 and return duct 16 may be formed by a tube panel forming the outer wall 26 of the return duct 16, the tube panel having a header 26' for connection thereof to a fluid recirculation system. Then an intermediate vertical tube panel (not shown) may be provided parallel to the side wall 22 to form a space therebetween. In this case, the space between the side wall 22 and the intermediate tube panel forms, at its upper part, a double wall construction or inner wall for the separator, and at its lower part the return duct. A separate second tube panel is then connected on the outside of the upper part of the first tube panel to form the separator.

In the lower portion of the return duct 16—as seen in FIG. 1—a heat exchanger chamber 36, having a bed 38 of solid particles therein, is provided. The heat exchanger chamber 36 is formed substantially below the inclined portion 22a of the side wall 22, the heat exchanger chamber 36 thereby having a larger cross sectional area than the portion of return duct 16 above it. The bed 38 is preferably a bubbling bed 38 of recycling particles in the heat exchanger chamber 36. Gas for fluidizing the bed 38 is introduced through fluidizing gas nozzles 39. Heat transfer surfaces (e.g. tubes) 40 are disposed in the bed 38.

A first type of solid particle inlets 42 is formed in the lower part of the common wall 22 for allowing solid particles to be transported from the heat exchanger chamber 36 into the combustion chamber 12. The first type of solid particle inlets 42 constitute several narrow slot like passages or openings 44 disposed one on top of the other, as seen in FIG. 1. Transporting gas is introduced through gas nozzles 45 for transporting solid particles through the inlets 42.

The bottom 46 of the return duct 16 is staged, the heat transfer section 36 disposed above it, and having a separate lower section 48 at the lowest section of the staged bottom 46 for discharge of solid particles through solid particle inlets 42.

A barrier bed 50 of particles is maintained between the solid particle inlets 42 and the heat transfer 36 section for preventing fluidizing gas and transporting gas from interfering with each other, and thus facilitating desired control of heat transfer.

A passage 52 for introducing solid material directly from the combustion chamber 12 into the return duct 16 is disposed above the bed 38 of solid particles in the common wall 22a. Solid material circulating within the combustion chamber 12, especially solid material flowing downwardly along the walls of the combustion chamber 12, flows through the passage 52 into the heat exchanger chamber 36. Guide means shaped, e.g. a shaped lip 54, may be disposed in the combustion chamber 12 to guide the solid flow towards the passage 52, or to gather solid particles from an area larger than the cross sectional area of the passage 52 and cause the particles to flow into the return duct 16. Means, such as a screen (not shown) in front of passage 52, may be provided to prevent particles larger than a desired size from flowing into the passage 52.

The passage 52 also may—especially during high load conditions—be used as an overflow type of solid particle inlet for reintroducing solid particles from the return duct 16 into the combustion chamber 12. At high load conditions the overflow of particles from the combustion chamber 12 may be used to prevent solid particles from flowing from the combustion chamber 12 into the return duct 16. At high load conditions enough solid material is usually already circulating through the particle separator 14 into the return duct 16. The flow direction and flow rate of solid material through the passages 52 may be controlled by gas flows, e.g. by injecting gas into the passages 52 or at desired points in the surrounding volume.

Alternatively, separate passages for introducing solid particles from the combustion chamber 12 into the return duct 16 and overflow openings for reintroducing solid particles from the return duct 16 into the combustion chamber 12 may be used. If different passages and overflow openings are used they may be disposed at different vertical and/or horizontal locations, any passage for introducing solid material into the return duct 16 preferably being disposed above any overflow opening. The passages or overflow openings may also be used to discharge gas from the return duct 16 into the combustion chamber 12. In the FIG. 1 embodiment, separate gas inlets 56 are disposed in the common wall 22 at a level above the top surface of the bed 38, for discharging gas from the gas space 16″ of the return duct 16 into the combustion chamber 12.

The lower portions 22a, 24a of the side walls 22, 24 in the combustion chamber 12 are preferably inclined (e.g. at the top thereof making an angle of roughly 15°–40° to the vertical) so as to provide a smaller cross sectional area in the lower part than in the upper part of the combustion chamber 12. This leads to higher flow velocities in the lower part of the combustion chamber 12, and very vigorous movement of the solid material therein, which improves the direct flow of solid particles through passages 52 into the return duct 16. In some applications gas may be injected into the lower part of the combustion chamber 12 to provide jets or fountains of solid material at desired locations within the combustion chamber 12. These jets may be used to, guide solid material towards the passages 52 to facilitate introduction of solid material into the return duct 16.

A gas seal 58 is provided between the upper part of the return duct 16 and the particle separator 14 for preventing gas from flowing from the return duct 16 into the separator 14. The gas seal 58 construction includes a duct 60 formed in the bottom part of the separator 14, inlet openings 62 between the duct 60 and the upper part of the return duct 16 and solid particles forming a bed 64 in the duct 60. Particles in bed 64 are fluidized by gas added through gas introduction nozzles 31, and transported to the chamber 16″ by gas introduced through nozzles 31′. The inlet openings 62 are vertically narrow horizontal slots which form a solid flow seal between the duct 60 and the return duct 16. The solid flow seal prevents uncontrolled solid flow from separator 14 to return duct 16, so that a desired bed level, providing a desired gas seal, is maintained in the duct 60, preventing gas from duct 16″ from flowing into separator 14.

Preferably the entire system 10 is maintained pressurized—i.e. at superatmposheric pressure, typically at least twice atmospheric pressure.

While the invention has been described in connection with what is presently considered to be a most practical and preferred embodiment of the invention, it is to be understood that the invention is not to be limited to the disclosed embodiments, but on the contrary, is intended to cover various modifications and equivalent arrangements. For example, the circulating fluidized bed system described can include a plurality return ducts, only one or some of them including a heat exchanger chamber such as the type 36 described above. Also, a plurality of heat exchanger sections could be disposed horizontally in the lower part of the return duct, one after the other along the side wall 22. The solid material could be introduced into the return duct 16 into the locations between heat exchanger sections, and/or the solid material could be discharged from the return duct through solid particle inlets or overflow openings disposed within the heat exchanger sections or in locations between them. Thus the invention is to be accorded the broadest interpretation of the appended claims so as to encompass all equivalent methods and apparatus.

What is claimed is:

1. A method of operating a circulating fluidized bed system, utilizing: a combustion chamber, having a fluidized bed of solid particles therein; a particle separator connected to a discharge opening in an upper portion of the combustion chamber; a return duct connected at an upper portion thereof to the particle separator, and at a lower portion to the combustion chamber; a heat exchanger chamber formed in the lower portion of the return duct, the heat exchanger chamber having a wall section in common with the combustion chamber; and a solid particle inlet in the common wall section; the method comprising the steps of:

(a) establishing a fast fluidized bed of solid particles in the combustion chamber so that a particle suspension comprising flue gases and solid particles entrained therein is caused to flow upwardly in the combustion chamber and to be discharged through the discharge opening;

(b) separating solid particles from the particle suspension in the particle separator;

(c) directing separated solid particles into the return duct having a heat exchanger chamber in a lower portion thereof;

(d) establishing a bed of solid particles in the heat exchanger chamber;

(e) reintroducing solid particles from the heat exchanger chamber into the combustion chamber through the solid particle inlet disposed in the common wall section; and (f) introducing additional solid particles directly from the combustion chamber into the lower portion of the return duct through a passage in the wall section common to the heat exchanger chamber and combustion chamber.

2. A method as recited in claim 1, wherein step (d) is practiced during high load conditions primarily by collecting therein solid particles separated from the particle suspension.

3. A method as recited in claim 1, wherein the common wall has a passage therein, and comprising the further step of maintaining the fluidized bed of solid particles in the heat exchanger chamber during low load conditions primarily by collecting particles flowing in the vicinity of a side wall of the combustion chamber, the particles flowing parallel to, at an inclined angle or perpendicularly to the side wall, and directing the particles through the passage into the return duct.

4. A method as recited in claim 1, wherein the common wall has a passage therein, and wherein step (f) is practiced by introducing additional solid particles into the heat exchanger chamber through the passage, above the solid particle inlet.

5. A method of operating a circulating fluidized bed system, utilizing: a combustion chamber, having a fluidized bed of solid particles therein; a particle separator connected to a discharge opening in an upper portion of the combustion chamber; a return duct connected at an upper portion thereof to the particle separator, and at a lower portion to the combustion chamber; a heat exchanger chamber formed in the lower portion of the return duct, the heat exchanger chamber having a wall section in common with the combustion chamber; and a solid particle inlet and a passage in the common wall section; the method comprising the steps of:

(a) establishing a fast fluidized bed of solid particles in the combustion chamber so that a particle suspension comprising flue gases and solid particles entrained therein is caused to flow upwardly in the combustion chamber and to be discharged through the discharge opening;

(b) separating solid particles from the particle suspension in the particle separator;

(c) directing separated solid particles into the return duct having a heat exchanger chamber in a lower portion thereof;

(d) establishing a bed of solid particles in the heat exchanger chamber;

(e) reintroducing solid particles from the heat exchanger chamber into the combustion chamber through the solid particle inlet disposed in the common wall section; and (f) introducing additional solid particles directly from the combustion chamber into the lower portion of the return duct and into the heat exchanger chamber through the passage in an inclined wall section of the lower part of the combustion chamber, above the solid particle inlet.

6. A method of operating a circulating fluidized bed system, utilizing: a combustion chamber, having a fluidized bed ofsolid particles therein; a particle separator connected to a discharge opening in an upper portion of the combustion chamber; a return duct connected at an upper portion thereof to the particle separator, and at a lower portion to the combustion chamber; a heat exchanger chamber formed in the lower portion of the return duct, the heat exchanger chamber having a wall section in common with the combustion chamber; and a solid particle inlet in the common wall section; the method comprising the steps of:

(a) establishing a fast fluidized bed of solid particles in the combustion chamber so that a particle suspension comprising flue gases and solid particles entrained therein is caused to flow upwardly in the combustion chamber and to be discharged through the discharge opening;

(b) separating solid particles from the particle suspension in the particle separator;

(c) directing separated solid particles into the return duct having a heat exchanger chamber in a lower portion thereof;

(d) establishing a bed of solid particles in the heat exchanger chamber;

(e) reintroducing solid particles from the heat exchanger chamber into the combustion chamber through the solid particle inlet disposed in the common wall section through several vertically narrow substantially horizontal slots disposed below the bed surface in the heat exchanger chamber, the slots disposed one on top of the other in the common wall;

(f) introducing additional solid particles directly from the combustion chamber into the lower portion of the return duct; and (g) forming a solid flow valve between the fluidized beds in the heat exchanger chamber and the combustion chamber.

7. A method of operating a circulating fluidized bed system, utilizing: a combustion chamber, having a fluidized bed of solid particles therein; a particle separator connected to a discharge opening in an upper portion of the combustion chamber; a return duct connected at an upper portion thereof to the particle separator, and at a lower portion to the combustion chamber; a heat exchanger chamber formed in the lower portion of the return duct, the heat exchanger chamber having a wall section in common with the combustion chamber; and a solid particle inlet in the common wall section; the method comprising the steps of:

(a) establishing a fast fluidized bed of solid particles in the combustion chamber so that a particle suspension comprising flue gases and solid particles entrained therein is caused to flow upwardly in the combustion chamber and to be discharged through the discharge opening;

(b) separating solid particles from the particle suspension in the particle separator;

(c) directing separated solid particles into the return duct having a heat exchanger chamber in a lower portion thereof;

(d) establishing a bed of solid particles in the heat exchanger chamber;

(e) reintroducing solid particles from the heat exchanger chamber into the combustion chamber through the solid particle inlet and an overflow opening disposed in the common wall section; and (f) introducing additional solid particles directly from the combustion chamber into the lower portion of the return duct.

8. A method of operating a circulating fluidized bed system, utilizing: a combustion chamber, having a fluidized bed of solid particles therein; a particle separator connected to a discharge opening in an upper portion of the combustion chamber; a return duct connected at an upper portion thereof to the particle separator, and at a lower portion to the combustion chamber; a heat exchanger chamber formed in the lower portion of the return duct, the heat exchanger chamber having a wall section in common with the combustion chamber; and a solid particle inlet in the common wall section, wherein heat transfer surfaces are disposed in the heat transfer section of the bed of solid particles in the heat exchanger chamber; and wherein the solid particle inlets are disposed below the bed level of another section of the bed; the method comprising the steps of:

(a) establishing a fast fluidized bed of solid particles in the combustion chamber so that a particle suspension comprising flue gases and solid particles entrained therein is caused to flow upwardly in the combustion chamber and to be discharged through the discharge opening;

(b) separating solid particles from the particle suspension in the particle separator;

(c) directing separated solid particles into the return duct having a heat exchanger chamber in a lower portion thereof;

(d) establishing a bed of solid particles in the heat exchanger chamber;

(e) reintroducing solid particles from the heat exchanger chamber into the combustion chamber through the solid particle inlet disposed in the common wall section;

(f) introducing additional solid particles directly from the combustion chamber into the lower portion of the return duct, and (g) separating the another section from the heat transfer section by a barrier bed of solid particles.

9. A method as recited in claim 1, comprising the further step of controlling heat transfer in the heat exchanger chamber by controlling the flow of particles therethrough.

10. A method of operating a circulating fluidized bed system, utilizing: a combustion chamber, having a fluidized bed of solid particles therein; a particle separator connected to a discharge opening in an upper portion of the combustion chamber; a return duct connected at an upper portion thereof to the particle separator, and at a lower portion to the combustion chamber; a heat exchanger chamber formed in the lower portion of the return duct, the heat exchanger chamber having a wall section in common with the combustion chamber; and a solid particle inlet in the common wall section; the method comprising the steps of:

(a) establishing a fast fluidized bed of solid particles in the combustion chamber so that a particle suspension comprising flue gases and solid particles entrained therein is caused to flow upwardly in the combustion chamber and to be discharged through the discharge opening;

(b) separating solid particles from the particle suspension in the particle separator;

(c) directing separated solid particles into the return duct having a heat exchanger chamber in a lower portion thereof;

(d) establishing a bed of solid particles in the heat exchanger chamber;

(e) reintroducing solid particles from the heat exchanger chamber into the combustion chamber through the solid particle inlet disposed in the common wall section;

(f) introducing additional solid particles directly from the combustion chamber into the lower portion of the return duct, and (g) providing a gas seal between the upper part of the return duct and the particle separator.

11. A circulating fluidized bed reactor system comprising:

a combustion chamber, having a fast fluidized bed of particles therein, an upper portion, a discharge opening from said upper portion, and a lower portion;

means for introducing fluidizing gas into said combustion chamber;

a particle separator connected to said discharge opening for separating solid particles from a particle suspension discharged from the combustion chamber through said discharge opening;

a return duct having upper and lower portions, and connected at its upper portion to said particle separator, and at its lower portion to said combustion chamber, for recycling separated solid particles from said particle separator into said lower portion of said combustion chamber;

a heat exchanger chamber formed in said lower portion of said return duct and having a bed of solid particles therein, for recovering heat from solid particles being recycled through said return duct;

a wall section in common with said combustion chamber and at least said heat exchanger chamber portion of said return duct;

a solid particle inlet in said common wall section, for introducing solid particles from said heat exchanger chamber into said combustion chamber; and means for introducing solid particles directly from said combustion chamber into said heat exchanger chamber through a passage in the wall section.

12. A circulating fluidized bed reactor system as recited in claim 11, wherein said means for introducing solid particles directly form said combustion chamber into said heat exchanger chamber comprises a passage formed in said common wall section between said heat exchanger chamber and said combustion chamber above said solid particle inlet.

13. A circulating fluidized bed reactor system as recited in claim 12 further comprising gathering means positioned in said combustion chamber for gathering solid particles and directing them towards said passage in said common wall section.

14. A circulating fluidized bed reactor system comprising:

a combustion chamber, having a fast fluidized bed of particles therein, an upper portion, a discharge opening from said upper portion, and a lower portion;

means for introducing fluidizing gas into said combustion chamber;

a particle separator connected to said discharge opening for separating solid particles from a particle suspension discharged from the combustion chamber through said discharge opening;

a return duct having upper and lower portions, and connected at its upper portion to said particle separator, and at its lower portion to said combustion chamber, for recycling separated solid particles from said particle separator into said lower portion of said combustion chamber;

a heat exchanger chamber formed in said lower portion of said return duct and having a bed of solid particles therein, for recovering heat from solid particles being recycled through said return duct;

a wall section in common with said combustion chamber and at least said heat exchanger chamber portion of said return duct, wherein said common wall section is inclined, and positioned so that an upper portion of said heat exchanger chamber is covered by said common wall section;

a solid particle inlet in said common wall section, for introducing solid particles from said heat exchanger chamber into said combustion chamber; and means for introducing solid particles directly from said combustion chamber into said heat exchanger chamber comprising a passage formed in said common wall section between said heat exchanger chamber and said combustion chamber above said solid particle inlet.

15. A circulating fluidized bed reactor system as recited in claim 11 wherein said solid particle inlet is disposed below the top surface of the bed in said heat exchanger chamber, and comprises a solid flow seal for controlling solid flow from said heat exchanger chamber into said combustion chamber.

16. A circulating fluidized bed reactor system comprising:

a combustion chamber, having a fast fluidized bed of particles therein, an upper portion, a discharge opening from said upper portion, and a lower portion;

means for introducing fluidizing gas into said combustion chamber;

a particle separator connected to said discharge opening for separating solid particles from a particle suspension discharged from the combustion chamber through said discharge opening;

a return duct having upper and lower portions, and connected at its upper portion to said particle separator, and at its lower portion to said combustion chamber, for recycling separated solid particles from said particle separator into said lower portion of said combustion chamber;

a heat exchanger chamber formed in said lower portion of said return duct and having a bed of solid particles therein; for recovering heat from solid particles being recycled through said return duct;

a wall section in common with said combustion chamber and at least said heat exchanger chamber portion of said return duct;

a solid particle inlet in said common wall section, for introducing solid particles from said heat exchanger chamber into said combustion chamber;

means for introducing solid particles directly from said combustion chamber into said heat exchanger chamber, and an overflow opening forming a solid flow inlet disposed in said common wall section for allowing solid particles to flow by overflow from said heat exchanger section to said combustion chamber.

17. A circulating fluidized bed reactor system comprising:

a combustion chamber, having a fast fluidized bed of particles therein, an upper portion, a discharge opening from said upper portion, and a lower portion;

means for introducing fluidizing gas into said combustion chamber;

a particle separator connected to said discharge opening for separating solid particles from a particle suspension discharged from the combustion chamber through said discharge opening;

a return duct having upper and lower portions, and connected at its upper portion to said particle separator, and at its lower portion to said combustion chamber, for recycling separated solid particles from said particle separator into said lower portion of said combustion chamber;

a heat exchanger chamber formed in said lower portion of said return duct and having a bed of solid particles therein, for recovering heat from solid particles being recycled through said return duct;

a wall section in common with said combustion chamber and at least said heat exchanger chamber portion of said return duct;

a solid particle inlet in said common wall section, for introducing solid particles from said heat exchanger chamber into said combustion chamber;

means for introducing solid particles directly from said combustion chamber into said heat exchanger chamber, and means for introducing fluidizing gas into a bottom portion of said heat exchanger chamber, and a gas flow opening disposed in said common wall between said return duct and said combustion chamber for discharging fluidizing gas from said return duct into said combustion chamber.

18. A circulating fluidized bed reactor system comprising:

a combustion chamber, having a fast fluidized bed of particles therein, an upper portion, a discharge opening from said upper portion, and a lower portion;

means for introducing fluid;zing gas into said combustion chamber;

a particle separator connected to said discharge opening for separating solid particles from a particle suspension discharged from the combustion chamber through said discharge opening;

a return duct having upper and lower portions, and connected at its upper portion to said particle separator, and at its lower portion to said combustion chamber, for recycling separated solid particles from said particle separator into said lower portion of said combustion chamber;

a heat exchanger chamber formed in said lower portion of said return duct and having a bed of solid particles therein, for recovering heat from solid particles being recycled through said return duct;

a wall section in common with said combustion chamber and at least said heat exchanger chamber portion of said return duct;

a solid particle inlet in said common wall section, for introducing solid particles from said heat exchanger chamber into said combustion chamber;

means for introducing solid particles directly from said combustion chamber into said heat exchanger chamber, and a gas seal disposed in said upper portion of said return duct for preventing gas from flowing from said lower portion of said return duct into said particle separator.

19. A circulating fluidized bed reactor system comprising:

a combustion chamber, having a fast fluidized bed of particles therein, an upper portion, a discharge opening from said upper portion; and a lower portion;

means for introducing fluid;zing gas into said combustion chamber;

a particle separator connected to said discharge opening for separating solid particles from a particle suspension discharged from the combustion chamber through said discharge opening;

a return duct having upper and lower portions, and connected at its upper portion to said particle separator, and at its lower portion to said combustion chamber, for recycling separated solid particles from said part;de separator into said lower portion of said combustion chamber;

a heat exchanger chamber formed in said lower portion of said return duct and having a bed of solid particles therein, for recovering heat from solid particles being recycled through said return duct;

a wall section in common with said combustion chamber and at least said heat exchanger chamber portion of said return duct;

a solid particle inlet in said common wall section, for introducing solid particles from said heat exchanger chamber into said combustion chamber;

means for introducing solid particles directly from said combustion chamber into said heat exchanger chamber, and wherein said combustion chamber comprises: a plurality of first, primarily vertical, tube panels forming an enclosure; and a second, primarily vertical, tube panel; said return duct and said heat exchanger chamber being formed between one of said first tube panels and said second tube panel.

20. A circulating fluidized bed reactor system comprising:

a combustion chamber, having a fast fluidized bed of particles therein, an upper portion, a discharge opening from said upper portion, and a lower portion;

means for introducing fluidizing gas into said combustion chamber;

a particle separator connected to said discharge opening for separating solid particles from a particle suspension discharged from the combustion chamber through said discharge opening;

a return duct having upper and lower portions, and connected at its upper portion to said particle separator, and at its lower portion to said combustion chamber, for recycling separated solid particles from said particle separator into said lower portion of said combustion chamber;

a heat exchanger chamber formed in said lower portion of said return duct and having a bed of solid particles therein, for recovering heat from solid particles being recycled through said return duct;

a wall section in common with said combustion chamber and at least said heat exchanger chamber portion of said return duct;

a solid particle inlet in said common wall section, for introducing solid particles from said heat exchanger chamber into said combustion chamber;

means for introducing solid particles directly from said combustion chamber into said heat exchanger chamber, and wherein said combustion chamber comprises: a plurality of first, primarily vertical, tube panels forming an enclosure; and a second, primarily vertical, tube panel; said particle separator, said return duct, and said heat exchanger chamber being formed between one of said first tube panels and said second tube panel.

21. A circulating fluidized bed reactor system comprising:

a combustion chamber, having a fast fluidized bed of particles therein, an upper portion, a discharge opening from said upper portion, and a lower portion;

means for introducing fluidizing gas into said combustion chamber;

a particle separator connected to said discharge opening for separating solid particles from a particle suspension discharged from the combustion chamber through said discharge opening;

a return duct having upper and lower portions, and connected at its upper portion to said particle separator, and at its lower portion to said combustion chamber, for recycling separated solid particles from said particle separator into said lower portion of said combustion chamber;

a heat exchanger chamber formed in said lower portion of said return duct and having a bed of solid particles therein, for recovering heat from solid particles being recycled through said return duct;

a wall section in common with said combustion chamber and at least said heat exchanger chamber portion of said return duct;

a solid particle inlet in said common wall section, for introducing solid particles from said heat exchanger chamber into said combustion chamber;

means for introducing solid particles directly from said combustion chamber into said heat exchanger chamber, and wherein said combustion chamber comprises: a plurality of first, primarily vertical, tube panels forming an enclosure; and a second, primarily vertical, tube panel; said return duct and said heat exchanger chamber being formed between one of said first tube panels and said second tube panel; and a third, primarily vertical, tube panel; said particle separator formed between said second and said third tube panels.

22. A circulating fluidized bed reactor system comprising:

a combustion chamber, having a fast fluidized bed of particles therein, an upper portion, a discharge opening from said upper portion, and a lower portion;

means for introducing fluidizing gas into said combustion chamber;

a particle separator connected to said discharge opening for separating solid particles from a particle suspension discharged from the combustion chamber through said discharge opening;

a return duct having upper and lower portions, and connected at its upper portion to said particle separator, and at its lower portion to said combustion chamber, for recycling separated solid particles from said particle separator into said lower portion of said combustion chamber;

a heat exchanger chamber formed in said lower portion of said return duct and having a bed of solid particles therein, for recovering heat from solid particles being recycled through said return duct;

a wall section in common with said combustion chamber and at least said heat exchanger chamber portion of said return duct;

a solid particle inlet in said common wall section, for introducing solid particles from said heat exchanger chamber into said combustion chamber;

means for introducing solid particles directly from said combustion chamber into said heat exchanger chamber, and wherein said combustion chamber, particle separator, and heat exchange chamber are all at a pressure at least twice atmospheric.

23. A method of operating a circulating fluidized bed system, utilizing: a combustion chamber having a fluidized bed of solid particles therein; a particle separator connected to a discharge opening in an upper portion of the combustion chamber; a return duct connected at an upper portion thereof to the particle separator, and at a lower portion to the combustion chamber; a heat exchanger chamber formed in the lower portion of the return duct; the heat exchanger chamber having a wall section in common with the combustion chamber; and a solid particle inlet in the common wall section; the method comprising the steps of:

(a) establishing a fast fluidized bed of solid particles in the combustion chamber so that a particle suspension comprising flue gases and solid particles entrained therein is caused to flow upwardly in the combustion chamber and to be discharged through the discharge opening;

(b) separating solid particles from the particle suspension in the particle separator;

(c) directing separated solid particles into the return duct having a heat exchanger chamber in a lower portion thereof;

(d) establishing a bed of solid particles in the heat exchanger chamber;

(e) reintroducing solid particles from the heat exchanger chamber into the combustion chamber through the solid particle inlet disposed in the common wall section;

(f) introducing additional solid particles directly from the combustion chamber into the lower portion of the return duct, and wherein steps (a)–(f) are practiced at a pressure at least twice atmospheric.

24. A method as in claim 1 wherein the common wall includes an inclined section and step (f) is practiced by introducing additional solid particles through the passage located in the inclined section.

25. A circulating fluidized bed reactor system comprising:

a combustion chamber, having a fast fluidized bed of particles therein, an upper portion, a discharge opening from said upper portion, and a lower portion;

means for introducing fluidizing gas into said combustion chamber;

a particle separator connected to said discharge opening for separating solid particles from a particle suspension discharged from the combustion chamber through said discharge opening;

a return duct having upper and lower portions, and connected at its upper portion to said particle separator, and at its lower portion to said combustion chamber, for recycling separated solid particles from said particle separator into said lower portion of said combustion chamber;

a heat exchanger chamber formed in said lower portion of said return duct and having a bed of solid particles therein, for recovering heat from solid particles being recycled through said return duct;

a wall section in common with said combustion chamber and at least said heat exchanger chamber portion of said return duct;

a solid particle inlet in said common wall section, for introducing solid particles from said heat exchanger chamber into said combustion chamber; and a passage in the wall section for introducing solid particles directly from said combustion chamber into said heat exchanger chamber.

26. A circulating fluidized bed reactor as in claim 25 wherein said passage is in an inclined section of the wall section.

27. A circulating fluidized bed reactor as in claim 25 wherein said wall section includes a vertical section.

28. A circulating fluidized bed reactor as in claim 27 wherein said wall section further includes an inclined section below the vertical section.

29. A circulating fluidized bed reactor as in claim 28 wherein said passage is located in the inclined section of the common wall.

* * * * *